(12) United States Patent
Polanyi et al.

(10) Patent No.: US 7,455,522 B2
(45) Date of Patent: Nov. 25, 2008

(54) SYSTEMS AND METHODS FOR DYNAMIC READING FLUENCY INSTRUCTION AND IMPROVEMENT

(75) Inventors: Livia Polanyi, Palo Alto, CA (US); Martin Henk van den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 887 days.

(21) Appl. No.: 10/263,834

(22) Filed: Oct. 4, 2002

(65) Prior Publication Data

US 2004/0067472 A1    Apr. 8, 2004

(51) Int. Cl.
*G09B 17/00* (2006.01)
*G09B 19/04* (2006.01)

(52) U.S. Cl. ..................... 434/178; 434/185
(58) Field of Classification Search ......... 434/156–185; 704/251, 258, 243, 275
See application file for complete search history.

(56) References Cited

U.S. PATENT DOCUMENTS

| | | | | |
|---|---|---|---|---|
| 4,643,450 | A * | 2/1987 | Morris | 434/179 |
| 5,065,317 | A * | 11/1991 | Hiramatsu et al. | 704/1 |
| 5,761,637 | A * | 6/1998 | Chino | 704/231 |
| 5,857,173 | A * | 1/1999 | Beard et al. | 704/276 |
| 5,870,709 | A | 2/1999 | Bernstein | |
| 6,161,091 | A | 12/2000 | Akamine et al. | |
| 6,205,456 | B1 * | 3/2001 | Nakao | 715/531 |
| 6,224,383 | B1 | 5/2001 | Shannon | |
| 6,299,452 | B1 | 10/2001 | Wasowicz et al. | |
| 6,324,507 | B1 | 11/2001 | Lewis et al. | |
| 6,358,055 | B1 * | 3/2002 | Rothenberg | 434/185 |
| 6,468,084 | B1 * | 10/2002 | MacMillan | 434/185 |
| 2004/0006468 | A1 * | 1/2004 | Gupta et al. | 704/254 |

OTHER PUBLICATIONS

U.S. Appl. No. 10/237,135, filed Sep. 9, 2002, Polanyi et al.
U.S. Appl. No. 09/609,325, filed Jun. 30, 2000, Polanyi et al.
U.S. Appl. No. 09/742,449, filed Dec. 22, 2000, Polanyi et al.
U.S. Appl. No. 09/689,779, filed Oct. 13, 2000, Polanyi et al.
U.S. Appl. No. 09/883,345, filed Jun. 19, 2001, Polanyi et al.
U.S. Appl. No. 09/630,371, filed Aug. 1, 2000, Polanyi et al.
U.S. Appl. No. 09/987,420, filed Nov. 14, 2001, Polanyi et al.
Tatham et al., "Modelling speech prosodics for synthesis-perspectives and trials", IEE Seminar, State-Of-The-Art In Speech Synthesis, London, Apr. 2000.

* cited by examiner

*Primary Examiner*—Scott E Jones
(74) *Attorney, Agent, or Firm*—Sughrue Mion, PLLC

(57) ABSTRACT

Techniques for dynamic personalized reading fluency instruction and improvement are provided by determining a user reading fluency level based on one or more spoken responses provided by the user during one or more reading aloud session of a text that has been evaluated for discourse structure and information structure of sentences. One or more reading fluency improvement aids are provided to the user based on one or more of: determined user-specific reading fluency deficiencies, user-personalized information responses and user class-specific reading fluency deficiencies as determined by the reading fluency improvement system.

25 Claims, 6 Drawing Sheets

| Sentence # | 1 | 2 | 3 | 4 | 5 |
|---|---|---|---|---|---|
| Theme | Japanese people eat | Noodles ... eaten | Noodles ... served | Noodles ... hot soup | Eaten IN JAPAN |
| Rheme | NOODLES | LUNCH SNACK | SEASON... HOT SOUP COLD | VEGETABLES TOFU MEAT ALSO | TYPES |
| Attachment | N/A | 1 | 2 | 3 | (S2-(S3-4)) |
| Relation | N/A | S | S | S | C |

| Sentence # | 6 | 7 | 8 | 9 | 10 |
|---|---|---|---|---|---|
| Theme | UDON | SOBA | The ... SOUP... [UDON] | RAMEN | Noodles ... |
| Rheme | THICK WHITE USUALLY SOUP | THIN BUCK-WEHAT | USUALLY... COOL SUMMER | VERY CURLY QUICK LATE | VARIATION ... MEAL |
| Attachment | 5 | 6 | 7 | (C 6-(S 7-8)) (S 5...)) | (C (S 2...) – (S 5 )) |
| Relation | S | C | S | C | C |

Fig. 3

SYSTEMS AND METHODS FOR DYNAMIC READING FLUENCY INSTRUCTION AND IMPROVEMENT

BACKGROUND OF THE INVENTION

1. Field of Invention

This invention relates generally to systems and methods for improving reading proficiency using computer analysis aids.

2. Description of Related Art

In conventional systems for reading evaluation, students' reading abilities are tested and the students are grouped according to determined reading fluency ability and instructor availability. Milestones or achievements standards are established for students based on age, grade or other criteria. Re-testing of students then occurs at regular intervals and the results compared to milestones for similarly classified groups of students. Remedial reading instruction, such as individual instruction, may then be provided for students who fail to achieve the milestones or achievement standards for similarly classified students. However, these types of instruction do not facilitate fluid reading of multiple sentences for meaning.

It is well known that a relationship exists between an individual's ability to process the speech sounds of a language and the normal acquisition or improvement of reading skills. Fluent readers recognize the relationship between the various sentences in a text. In reading aloud, they demonstrate their awareness by assigning the correct pitch level and stress to the words in each sentence. The information that is most salient in the sentence, because such information is "new" or "contrastive," will receive distinctive types of stress. A sentence that elaborates on information in a previous sentence could, for example, be read at a lower pitch level.

The prior art systems and methods for improving a reader's fluency are limited to systems and methods that involve a human instructor or those systems employing rudimentary, computer-based instructional features, such as highlighting the text to be read. These computer-based systems have limited or no graphical and/or auditory instruction and/or user response capabilities.

SUMMARY OF THE INVENTION

The prior art systems and methods for improving a reader's reading fluency level are limited to systems and methods that involve a human instructor or those systems employing rudimentary, computer-based instructional features, such as highlighting the text to be read. These computer-based systems have limited or no graphical and/or auditory instruction and/ or user response capabilities.

This invention provides systems and methods that enable dynamic reading fluency proficiency assessment.

This invention separately provides systems and methods that enable dynamic reading fluency improvement.

This invention separately provides systems and methods that evaluate a reader's fluency proficiency by monitoring the reader's speech prosodics and intonation during reading aloud sessions.

This invention separately provides systems and methods that compare a reader's speech prosodics and intonation to those expected from a fluent reader.

This invention separately provides systems and methods that improve a reader's fluency by providing computer-based pedagogical aids to the reader based on the reader's reading fluency level.

This invention separately provides systems and methods that enable computer-assisted reading fluency improvement at the sentence and paragraph levels.

This invention separately provides systems and methods that enable computer-assisted reading fluency improvement for each user based on personalization information, reading level and/or learning gradient information.

In various exemplary embodiments, the systems and methods according to this invention improve a user's reading fluency by providing a text evaluated for discourse structure and information structure of sentences to the user. In such exemplary embodiments, the systems and methods according to this invention determine a user's reading fluency level based on the one or more spoken responses provided by the user during one or more reading aloud session of the evaluated text. In such exemplary embodiments, the systems and methods according to this invention provide one or more computer-based pedagogical aids to the user based on the determined user's reading fluency level.

In various exemplary embodiments, the systems and methods according to this invention determine a user reading fluency level by evaluating a user's speech prosodics provided in the one or more spoken responses. One or more user speech intonation measures provided in the one or more spoken responses are then determined. The determined user speech prosodics are compared to one or more fluent-reader speech prosodics. The determined one or more user speech intonation measures are further compared to one or more fluent-reader speech intonation measures. One or more computer-based reading fluency improvement aids are provided to the user based on the speech prosodies and speech intonation measures comparison results.

In various other exemplary embodiments according to this invention, sentence level and paragraph level dynamic personalized reading fluency improvement is provided based on the user's current determined reading fluency level, learning gradient and personalization information. Personalization information includes age of the user, mother language of the user, parental socio-economic level or educational background, or any other known or later identified pedagogically useful information. In various exemplary embodiments, a tunable reading fluency improvement text summary is determined based on the personalization information, reading fluency level and learning gradient, and is then visually displayed and/or provided via an audio means to the user, reading instructor or other relevant person for improving the user's reading fluency level.

In various other exemplary embodiments according to this invention, reading fluency improvement aids, such as, for example, visual aids, audio aids, or visual/audio aids, may be presented to the user based on the determined reading performance of the user. In various exemplary embodiments, the reading fluency improvement aids are based on one or more of document annotation methods or techniques, document text color marking methods or techniques, acoustic clues production methods or techniques, and exaggerated intonation production methods or techniques.

In various other exemplary embodiments, the reading fluency improvement aids may also be dynamically adjusted based on the performance responses of the user. The systems and methods according to this invention integrate testing and learning of sentence and/or paragraph level concepts into a single user experience to build on determined strengths and to focus teaching resources on the determined weaknesses.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which:

FIG. 3 is one exemplary embodiment of a text string analyzed for discourse structure and information structure as implemented using various exemplary embodiments of the dynamic reading fluency improvement systems and methods according to this invention;

DETAILED DESCRIPTION OF EXEMPLARY EMBODIMENTS

Figure 1:
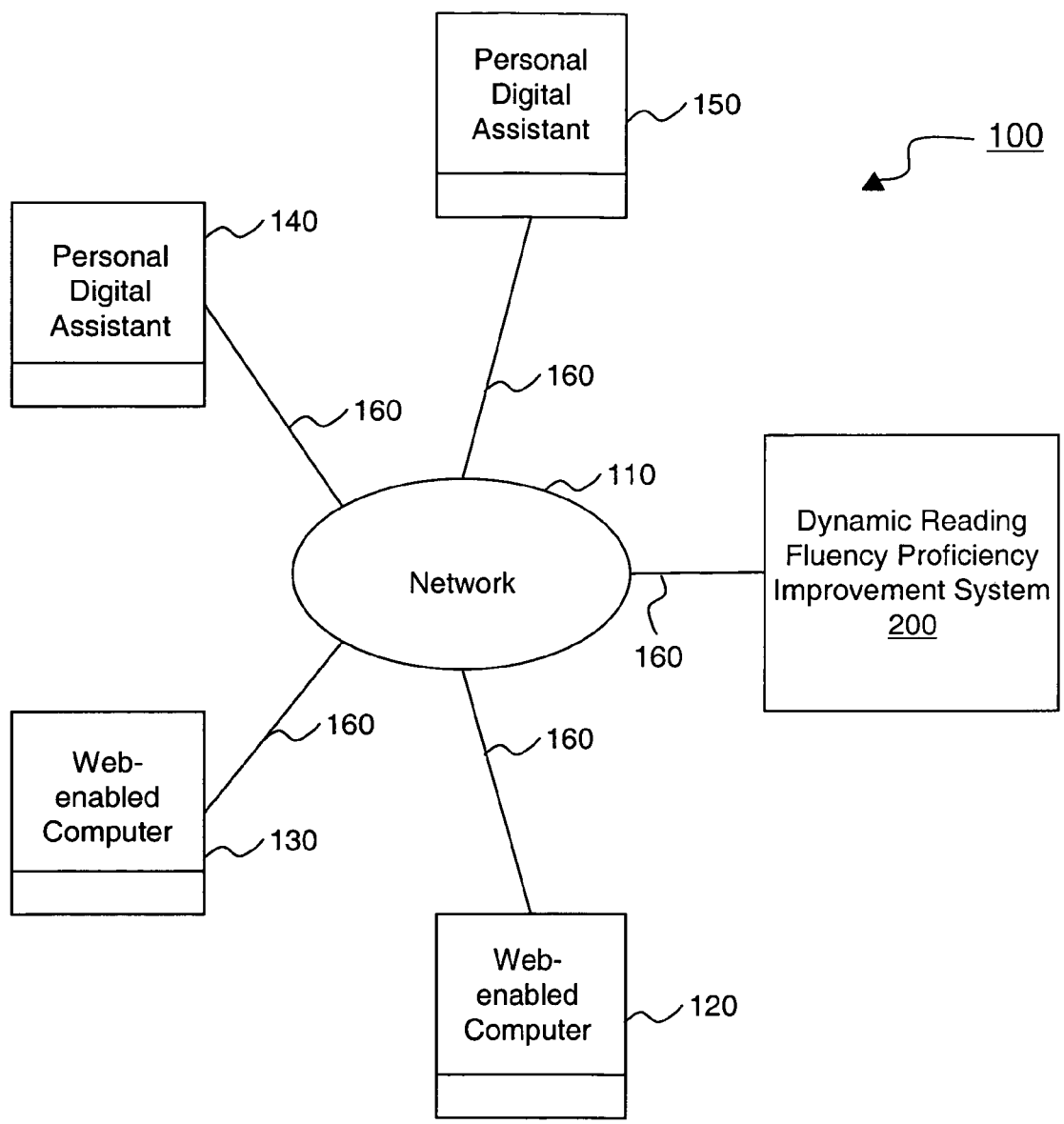
FIG. 1 shows one exemplary embodiment of a network that includes a dynamic reading fluency improvement system according to this invention.

FIG. 1 shows one exemplary embodiment of a network environment 100 that may be usable with the systems and methods of this invention. As shown in FIG. 1, the network environment 100 includes a network 110 having one or more network-enabled computers 120 and 130, one or more network-enabled personal digital assistants 140 and 150, and a reading fluency improvement system 200, each connected via a communications link 160. The network 110 includes, but is not limited to, for example, local area networks, wide area networks, storage area networks, intranets, extranets, the Internet, or any other type of distributed network, each of which can include wired and/or wireless portions.

As shown in FIG. 1, the reading fluency improvement system 200 connects to the network 110 via one of the links 160. The link 160 can be any known or later developed device or system for connecting the reading fluency improvement system 200 to the network 110, including a connection over public switched telephone network, a direct cable connection, a connection over a wide area network, a local area network, a storage area network, a connection over an intranet or an extranet, a connection over the Internet, or a connection over any other distributed processing network or system. In general, the link 160 can be any known or later developed connection system or structure usable to connect the reading fluency improvement system 200 to the network 110. The other links 160 are generally similar to this link 160.

It will be appreciated by those skilled in the art to which this invention pertains that the reading fluency improvement system 200 may also be installed on, and thus used with, a stand-alone device, such as, for example, a stand-alone personal computer system, which would not require connecting to a network server in order to access the reading fluency improvement system 200.

Figure 2:
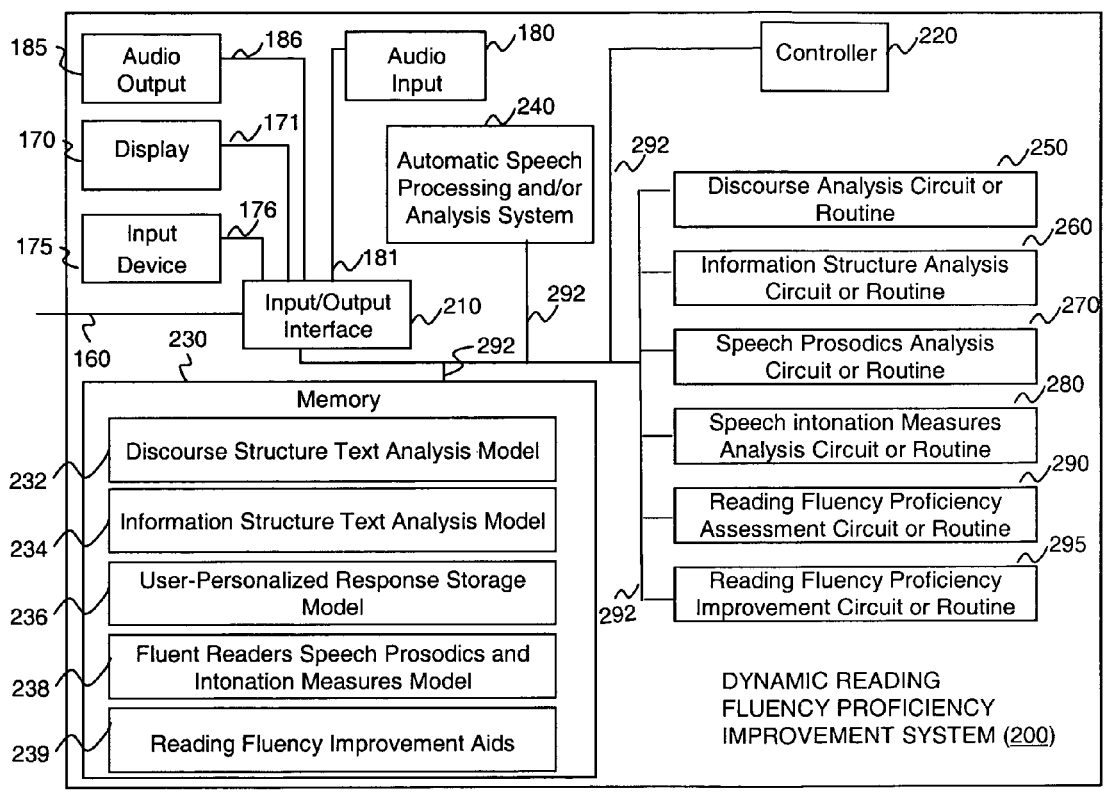
FIG. 2 is functional block diagram of one exemplary embodiment of a dynamic reading fluency improvement system according to this invention.

FIG. 2 illustrates a functional block diagram of one exemplary embodiment of the reading fluency improvement system 200 according to this invention. As shown in FIG. 2, the reading fluency improvement system 200 includes one or more display devices 170 usable to display information to the user, one or more user input devices 175 usable to allow the user or users to input data into the reading fluency improvement system 200, one or more audio input devices 180 usable to allow the user or users to input voice data or information into the reading fluency improvement system 200, and one or more audio output devices 185 usable to provide audio information or instruction to the user or users. The one or more display devices 170, the one or more input devices 175, the one or more audio input devices 180, and the one or more audio output devices 185 are connected to the reading fluency improvement system 200 through an input/output interface 210 via one or more communication links 171, 176, 181 and 186, respectively, which are generally similar to the link 160 above.

In various exemplary embodiments, the reading fluency improvement system 200 includes one or more of a controller 220, a memory 230, a discourse structure analysis text storage model 232, an information structure analysis text storage model 234, a user-personalized response storage model 236, a fluent-reader speech prosodics and intonation measures storage model 238, a reading fluency improvement aids model 239, an automatic speech processing and/or analysis system 240, a discourse analysis circuit or routine 250, an information structure analysis circuit or routine 260, a speech prosodics analysis circuit or routine 270, a speech intonation measures analysis circuit or routine 280, a reading fluency proficiency assessment circuit or routine 290, and a reading fluency proficiency improvement circuit or routine 295, all of which are interconnected over one or more data and/or control buses and/or application programming interfaces 292. In various exemplary embodiments, the discourse structure analysis text storage model 232, the information structure analysis text storage model 234, the user-personalized response storage model 236, the fluent-reader speech prosodics and intonation measures storage model 238, and the reading fluency improvement aids model 239 are stored in memory 230 of the reading fluency improvement system 200.

The controller 220 controls the operation of the other components of the reading fluency improvement system 200. The controller 220 also controls the flow of data between components of the reading fluency improvement system 200 as needed. The memory 230 can store information coming into or going out of the reading fluency improvement system 200, may store any necessary programs and/or data implementing the functions of the reading fluency improvement system 200, and/or may store data and/or user-specific reading fluency proficiency information at various stages of processing.

The memory 230 includes any machine-readable medium and can be implemented using appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the reading fluency improvement system 200 includes the discourse structure text analysis model 232 which the reading fluency improvement system 200 uses to analyze, based on a theory of discourse analysis, a text provided to the user. Discourse structure identifies candidate sentences available as "hooks" to link a new utterance into an unfolding text or interaction. The discourse structure text analysis model 232 may also be used to evaluate one or more spoken or verbal responses provided by the user. Further, the discourse structure text analysis model 232 may be used to store at least one text that has been previously evaluated based on one or more discourse analysis theories.

In various exemplary embodiments, the reading fluency improvement system 200 includes the information structure text analysis model 234 which the reading fluency improvement system 200 uses to evaluate the information structure of a text provided to the user. Information structure is used to determine which elements in a sentence contain important "new" information. The information structure text analysis model 234 may also be used to evaluate the information structure of one or more spoken responses or utterances provided by the user, based on a theory of information structure analysis.

It should be appreciated that, to simplify the explanation of the reading fluency improvement system 200, in the exemplary embodiment shown in FIG. 2, the discourse structure text analysis model 232 and the information structure text analysis model 234 are shown as separate text analysis models. When implementing the systems and methods according to this invention, the discourse structure text analysis model 234 and the information structure text analysis model 234 may be joined into a combined discourse structure/information structure text analysis model, may be developed as separate text analysis models, may be integrated into a higher level model of the reading fluency proficiency improvement system 200, or may be developed as a combination of any of these structures. The specific form that the discourse structure text analysis model 232 and the information structure text analysis model 234 take in any given implementation is a design choice and is not limited by this disclosure.

In various exemplary embodiments, from a text analysis perspective, integrating the information structure analysis and the sentence discourse structure analysis can be advantageous by reducing the discourse level ambiguity. In this case, the information structure identifies those sites within the sentence are most likely to link back to previous text. As a result, the number and/or type of candidate attachment points of a new utterance may be greatly reduced.

In various exemplary embodiments, the user-personalized response storage model 236 is used to evaluate and/or store user-personalized reading fluency assessment information, such as, for example, a tuned version of the text displayed, and/or audio provided, to the user based on user-identifying information, user personalization information, user-personalized reading fluency proficiency level and/or learning gradient, or the like. In addition, the user-personalized response storage model 236 may be used to store user-specific speech prosodics or intonation measures as previously identified and/or determined for that particular user.

In various exemplary embodiments, the fluent-reader speech prosodics and intonation measures model 238 is used to store various linguistic measures and/or speech measures of a group of readers previously identified and/or determined to be fluent readers. In various exemplary embodiments, the linguistic measures and/or speech measures may include one or more of speech prosodics, speech intonation measures, reading speed measures, and the like.

In various exemplary embodiments, the reading fluency improvement system 200 includes the reading fluency improvement aids model 239 which the reading fluency improvement system 200 uses to store various reading fluency improvement aids and/or other computer-based pedagogical aids. In various exemplary embodiments, the reading fluency improvement aids may include one or more of: visually-provided improvement aids, audio-provided improvement aids, or a combination thereof.

Figure 6:
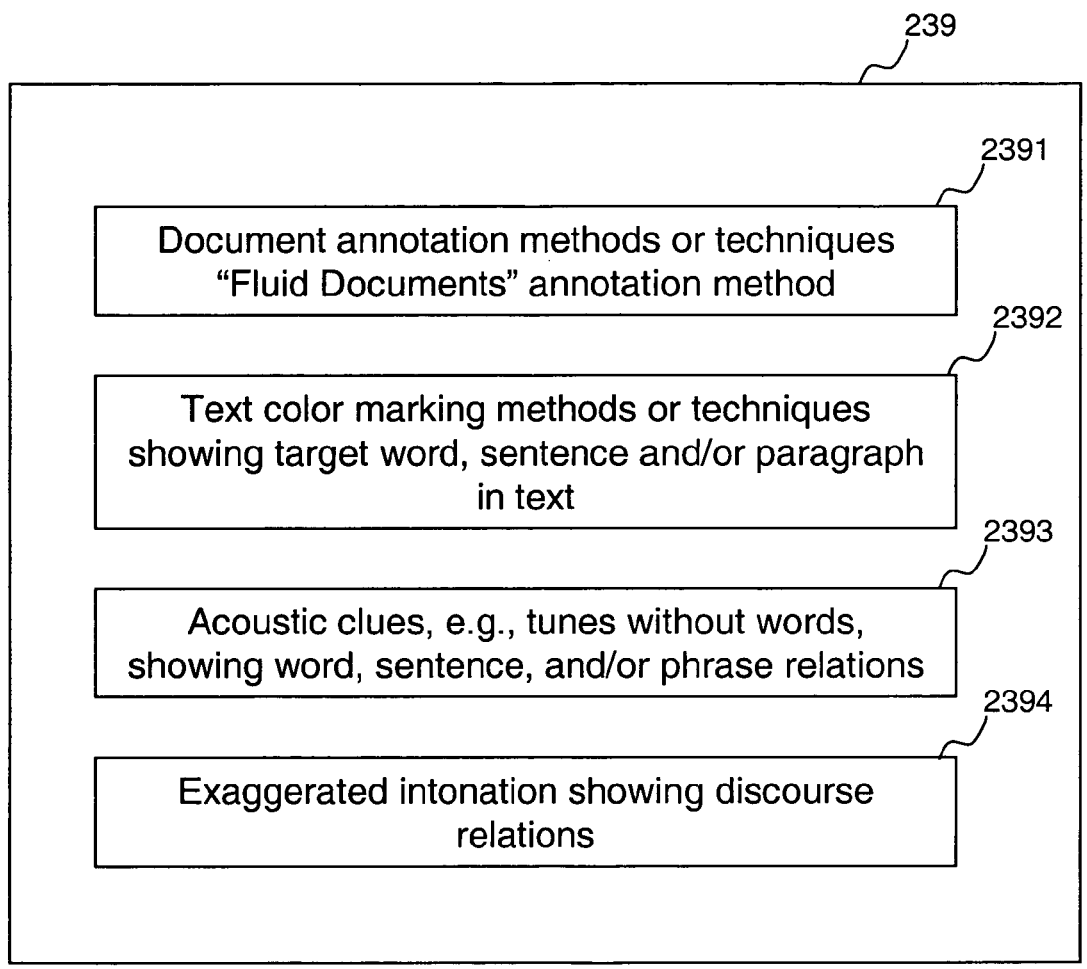
FIG. 6 shows exemplary embodiments of reading fluency improvement aids according to this invention.

FIG. 6 shows exemplary embodiments of reading fluency improvement aids included in the reading fluency improvement aids model 239 according to this invention. As shown in FIG. 6, reading fluency improvement aids may include one or more of: document annotation methods or techniques 2391, for example "fluid document" annotation techniques; text color marking methods or techniques 2392, for example methods showing target words, sentence and/or paragraph in the text read; acoustic clues techniques 2393, for example providing tunes without words that show various word, sentence and/or phrase relations; and audio-provided intonation techniques or methods 2394, for example using exaggerated intonation to emphasize various discourse relations and the like.

In various exemplary embodiments, the automatic speech processing and/or analysis system 240 is used to record and acoustically analyze a user's spoken responses or utterances. In operation, voice signals from a user's spoken responses or utterances are converted to output signals by the one or more audio input devices 180. The output signals are then digitized and are analyzed by the automatic speech processing and/or analysis system 240.

In various exemplary embodiments, the automatic speech processing and/or analysis 240 is used to record and/or analyze a user's speech utterances to determine the fundamental frequency, f(0), of the user's speech. The fundamental frequency f(0) is typically the strongest indicator to the listener how to interpret a speaker's intonation and stress. In various exemplary embodiments, the automatic speech processing and/or analysis 240 is also used to determine the prosody of the speech utterances provided by the user; long or filled pauses, hesitations and restarts may also be tracked In various exemplary embodiments, the automatic speech processing and/or analysis 240 may include any known or later developed speech processing and analysis system. In various exemplary embodiments, the automatic speech processing and/or analysis 240 includes the WAVES® speech processing system developed by Entropic Corp.; the PRAAT speech processing system developed by the Institute of Phonetic Sciences, University of Amsterdam; the EMU Speech Database System of the Speech Hearing and Language Research Centre, Macquarie University; SFS from University Collage London; and TRANSCRIBER from the Direction Des Centres d'Expertise et d'Essais, French Ministry of Defense.

In various exemplary embodiments, the discourse analysis circuit or routine 250 is activated by the controller 220 to evaluate, using one or more theories of discourse analysis, a text and/or one or more spoken or verbal responses provided by the user. In various exemplary embodiments, the discourse analysis circuit or routine 250 evaluates a text and/or one or more spoken or verbal responses provided by the user using a theory of discourse analysis such as the Linguistic Discourse Model (LDM) discussed in U.S. patent application Ser. No. 09/609,325, "System and Method for Teaching Writing Using Microanalysis of Text". In various other exemplary embodiments, the Discourse Structures Theory, the Linguistic Discourse Model, the Rhetorical Structure Theory, the Systemic Functional Grammar and/or the Tagmemics technique may be used by the discourse analysis circuit or routine 250 to evaluate the text and/or the one or more spoken or verbal responses.

In various exemplary embodiments, the information structure analysis circuit or routine 260 is activated by the controller 220 to evaluate, using one or more theories of information structure analysis, a text and/or one or more spoken or verbal responses provided by the user. As discussed in greater detail below, from a text analysis perspective, integrating the information structure analysis and the sentence discourse structure analysis advantageously reduces the discourse level ambiguity.

In various exemplary embodiments, under the Linguistic Discourse Model, the representation of a discourse is constructed incrementally using information in the surface structure of incoming utterances together with discourse construction rules and inference over the meaning of the utterances to recursively construct an open-right tree of discourse constituent units (DCUs), as described in co-pending U.S. patent application Ser. Nos. 09/609,325, 09/742,449, 09/689,779, 09/883,345, 09/630,371, and 09/987,420, each incorporated herein by reference in the entirety. This discourse constituent unit tree indicates which units are accessible for continuation and anaphora resolution.

All nodes on the Linguistic Discourse Model tree are first class objects containing structural and semantic information. Terminal nodes correspond to the strings of the discourse. Non-terminals are constructed nodes labeled with a discourse relation. Non-terminal nodes include, but are not limited to coordination (C-) nodes, subordination (S-) nodes, and binary nodes.

Information structure (IS) is represented at terminal and non-terminal nodes. A coordination-node inherits the generalization of the themes of its constituent nodes and the rhemes of the constituent nodes. An subordination-node directly inherits the information structure of its subordinating daughter.

In various exemplary embodiments, the systems and methods according to this invention consider the attachment to be (1) a coordination-node if the theme of the main clause of the new sentence matches thematic information available at the attachment point, or (2) an subordination-node if the theme of the main clause of the new sentence matches rhematic information available at the attachment point. It should be appreciated that binary nodes, which are used to represent the structure of discourse genres as well as conversational adjacency structures and logical relations, are not considered in this exemplary embodiment because the binary nodes follow more ad-hoc, though well-defined, rules. However, it should be appreciated that binary nodes are important nodes and may be included in any embodiment practiced according to the systems and methods of this invention.

In analyzing a discourse, each incoming sentence is assigned its place in the emerging discourse tree using discourse syntax. In current approaches, lexical information, syntactic and semantic structure, tense and aspect, and world knowledge are used to infer the attachment point and relation. However, after exploiting these resources, attachment ambiguities often still remain. Given that normal language users seldom experience discourse attachment ambiguities, additional sources of information must be used in attachment decisions. The information structure of both the incoming sentence and accessible discourse constituent units provides information critical for disambiguation. The problem of identifying the target discourse constituent unit that provides the context for information structure assignment for an incoming sentence is analogous to anaphora resolution. That is, the target unit must be along the right edge of the tree and therefore accessible.

From a discourse perspective, the information structure of an incoming sentence divides the incoming sentence into a theme, which typically is linked back to the preceding discourse, and a rheme, which may not be linked back to the preceding discourse. Establishing a link between the theme of the main clause of a new sentence and information available at an accessible node in the tree determines the sentence's attachment point. The type of attachment, such as, for example, coordination, subordination, or binary, reflects the theme's relation to the information structure of the discourse constituent unit represented at the attachment node.

FIG. 3 illustrates a chart of an exemplary text analyzed using various exemplary embodiments of an integrated approach of discourse structure analysis and information structure analysis according to this invention. For the sake of presentational simplicity, the constituent discourse constituent units are assumed to be sentences. However, under the Linguistic Discourse Model, the much more finely-grained discourse constituent unit segmentation conventions enable subordinate clauses to serve as attachment points for the main clauses of subsequent sentences.

As described below and shown in the exemplary sentence embodiments of FIG. 3, themes are marked with a "θ" while rhemes are unmarked. Words receiving stress are shown capitalized.

| | |
|---|---|
| Sentence 1 | (Japanese people occasionally choose to eat)$_\theta$ NOODLES. |
| Sentence 2 | (Noodles are USUALLY eaten)$_\theta$ for LUNCH or a light SNACK. |
| Sentence 3 | Depending on the SEASON, (noodles might be served)$_\theta$ in a HOT SOUP or COLD like a salad. |
| Sentence 4 | (When noodles are served in a hot SOUP,)$_\theta$ VEGETABLES, TOFU, and MEAT are ALSO found within the soup. |
| Sentence 5 | Several TYPES of noodles (are eaten IN JAPAN.)$_\theta$ |
| Sentence 6 | (UDON)$_\theta$ are THICK, WHITE noodles made fresh from wheat flour and are USUALLY served with a hot soup. |
| Sentence 7 | (SOBA)$_\theta$ are THIN BUCKWHEAT noodles which are FIRMER than udon. |
| Sentence 8 | (They can be served in a SOUP like UDON,)$_\theta$ but are USUALLY served as a COOL dish in the SUMMER. |
| Sentence 9 | (RAMEN)$_\theta$ are very thin, CURLY wheat noodles served as a QUICK meal or a LATE night SNACK. |
| Sentence 10 | (Noodles are eaten)$_\theta$ as a VARIATION for the daily MEAL. |

As the chart shown in FIG. 3 indicates, Sentences 1-4 exhibit theme-rheme chaining, resulting in nested subordinations. For Sentence 5, the appropriate context for information structure assignment is provided by Sentence 2, with a theme-theme link resulting in a coordination. The rheme of Sentence 5 intentionally introduces a set of types of noodles picked up as the theme alternative set for Sentence 6, 7 and 9. The theme focus for each of these sentences (udon, soas, ramen) is presupposed to belong to this set. These sentences are therefore coordinated to each other and subordinated to Sentence 5.

Processing Sentence 8 demonstrates that both discourse structure and information structure may operate autonomously. The information structure of Sentence 8 is determined primarily by the conjunction but which acts with the possibility modal in its first conjunct, which provides an accessible set of possible worlds as the rheme alternative set, to construct a theme-rheme pair. At the same time, the discourse attachment of Sentence 8 fulfills anaphora resolution requirements, rather than information structure.

For Sentence 10, Sentence 5 provides the appropriate context for the information structure assignment. The theme-theme link results in a coordination that pops the state of the discourse several levels.

It should be appreciated that, although the assignment of information structure to a sentence depends on the discourse structure, and the construction of the discourse structure may depend on the information structure of the units involved, the dependency between information structure and discourse structure is complementary, rather than circular. For the speaker, the discourse structure provides a set of possible contexts for continuation, while information structure assignment is independent of discourse structure. For the listener, the information structure of a sentence, together with the discourse structure, instructs the listener how rhematic information should be used to update the meaning representation of the discourse. Thus, the relationship between discourse structure and information structure reflects the different but closely related tasks of speaker and listener in a communicative situation.

In various exemplary embodiments, the speech prosodics analysis circuit or routine 270 is activated by the controller 220 to determine one or more speech prosody metrics or measures of the one or more spoken or verbal utterances provided by the user. In various exemplary embodiments, the speech prosodics analysis circuit or routine 270 determines one or more speech prosody metrics or measures, such as, for example, speech rhythm, speech stress, and speech intonation. The speech prosodics analysis circuit or routine 270 evaluates the user's one or more spoken or verbal utterances using the automatic speech processing and/or analysis system 240.

In various exemplary embodiments, the speech intonation measures analysis circuit or routine 280 is activated by the controller 220 to determine one or more speech intonation metrics or measures of the one or more spoken or verbal utterances provided by the user. In various exemplary embodiments, the speech intonation measures analysis circuit or routine 280 determines one or more speech intonation metrics or measures, such as, for example, pitch level, pitch range, speech rate, and speech amplitude. The speech intonation measures analysis circuit or routine 280 evaluates the user's one or more spoken or verbal utterances previously processed by the automatic speech processing and/or analysis system 240.

In various exemplary embodiments, the reading fluency proficiency assessment circuit or routine 290 is activated by the controller 220 to determine a user's reading fluency level based on the one or more spoken responses provided by the user during one or more reading aloud sessions of a text that has been evaluated for discourse structure and information structure of sentences. In various exemplary embodiments, the reading fluency proficiency assessment circuit or routine 290 determines the user's reading fluency level by analyzing one or more user speech prosodic measures obtained from the one or more spoken responses and/or one or more user speech intonation measures obtained from the one or more spoken responses, and/or by comparing the determined one or more user speech prosodic measures to one or more fluent readers speech prosodic measures and/or the determined one or more user speech intonation measures to one or more fluent readers speech intonation measures.

In various exemplary embodiments, the reading fluency proficiency improvement circuit or routine 295 is activated by the controller 220 to provide to the user one or more reading fluency improvement aids based on the determined user's reading fluency level. In various exemplary embodiments, the reading fluency proficiency improvement circuit or routine 295 provides to the user one or more reading fluency improvement aids by comparing the determined user's reading fluency level to one or more fluent-reader fluency levels. One or more user-specific reading fluency deficiencies are then determined. One or more reading fluency improvement aids are provided to the user to enable the user to recognize various discourse structure and/or information structure relations of sentences and/or phrases.

In various exemplary embodiments, one or more reading fluency improvement aids are provided to the user based on one or more of: determined user-specific reading fluency deficiencies, user-personalized information responses and user class-specific reading fluency deficiencies as determined by the reading fluency improvement system.

In various exemplary embodiments, a user employing a network-enabled computing device, such as, for example, computer 120, initiates a computer-assisted reading fluency improvement session with the dynamic reading fluency improvement system 200 over the communications link 160. In various exemplary embodiments, the reading fluency improvement session is initiated by requesting a login web page served by the dynamic reading fluency improvement system 200 and associated with a uniform resource locator or URL, or by using any other identified login method or technique. It will be appreciated by those skilled in the art that, in various other embodiments according to this invention, the dynamic reading fluency improvement system 200 may be located within a dedicated server, within a content server which also provides instructional content, on a stand-alone user device, or at any other location accessible by communications links 160. In various other embodiments according to this invention, any one or more of the dynamic reading fluency improvement system 200 may be located within a user access device such as dynamic reading fluency improvement enabled personal digital assistants 140 and/or 150 without departing from the spirit or scope of this invention.

Once the user begins the session, the dynamic reading fluency improvement system 200 forwards the requested login web page to network-enabled computer 120 over the communication link 160. User identifying information is entered and returned to the dynamic reading fluency improvement system 200. Based on user identifying information, previously stored reading fluency level personalization, reading fluency learning gradient and user personalization information is retrieved for each user. Sentence level or phrase level dynamic reading fluency proficiency assessment is initiated based on personalization information and/or prior user session information.

In various exemplary embodiments according to this invention, word level reading fluency proficiency improvement and/or instruction is used to familiarize the user with word concepts using comprehension aids such as graphic icons, animation clips, video and/or sound clips or any other information useful in conveying the concept to the user. The words and associated comprehension aids are displayed with a layout complexity based on the user's dynamically determined performance and/or current word recognition level. Display words are dynamically selected from a list of previously categorized words based on the current word recognition level, learning gradient and/or personalization information for the identified user.

Sentence level instruction familiarizes the user with fluid reading. In particular, the dynamic reading fluency improvement system 200 provides an integrated and supportive platform that helps users transition from single sentence parsing of texts to integrated fluid reading. In fluid reading, the user absorbs new information by exploiting the user's existing understanding of the sentence. In sentence level instruction, a text is retrieved and analyzed further using a theory of discourse analysis such as the Linguistic Discourse Model discussed in "System and Method for Teaching Writing Using Microanalysis of Text". In various other exemplary embodiments, the Discourse Structures Theory, the Linguistic Discourse Model, the Rhetorical Structure Theory, the Systemic Functional Grammar and/or the Tagmemics technique may be used in various exemplary embodiments of the systems and methods according to this invention.

In various exemplary embodiments according to this invention, a tunable text summary may be generated. For example, the tunable text summary may be generated using any of the systems and methods discussed in "Systems and Methods for Generating Text Summaries" and "Systems and Methods for Generating Analytic Summaries". Alternatively, any other known or later-developed system or method for generating a grammatical tunable text summary may be used in various exemplary embodiments of the systems and methods according to this invention.

Based on the performance and personalization information of the user of network-connected computer 120, a personalized, tuned version of the text and/or sentence is displayed to the user. If the user indicates that assistance in reading the sentence is required, the more salient information in the sentence is displayed with a different display attribute. For example, the more salient information may be differentiated using highlighting, bolding, alternate color or output using an alternate voice for speech output or using any other known or later-developed method of differentiating the salient information. The differentiated salient information prompts the user to focus on the familiar, core knowledge in the sentence while integrating the unfamiliar concepts in portions of the sentence. In this way, the user is trained to integrate new information by exploiting existing knowledge of semantic and grammatical constraints. It should be appreciated that a user's understanding of concepts is dynamically monitored by the systems and methods for dynamic personalized reading instruction according to this invention. Thus, in various exemplary embodiments according to this invention, the user's core knowledge may be deduced from previous personalized reading instruction sessions for the user.

Based on the user's current reading level and learning gradient, salient information is selected for display. For example, the rank of information displayed from a tunable text summary is dynamically adjusted to present more or less difficult sentences to a user. Personalization information is also used to personalize the selected instructional text to heighten user interest and/or to present the selected instructional text using a language specific layout. For example, personalization information specifying a language of instruction is used to specify the vertical alignment of the selected instructional text. A user learning to read using a Japanese or Chinese language text is determined and, based on the determined reading level, an appropriate text layout is determined. More complex text layouts, including horizontal alignments and the like, may be introduced as the user progresses to more advanced reading levels.

Users of network-connected personal digital assistants 140 and 150 may similarly initiate reading fluency proficiency improvement sessions with the dynamic reading fluency proficiency improvement system 200. Additionally, as discussed above, it will be apparent that the sentence level and/or combined sentence and phrase level dynamic reading fluency proficiency improvement system 200 may be a single device and may be operated in a stand-alone configuration without departing from the spirit or scope of this invention.

Figure 4:
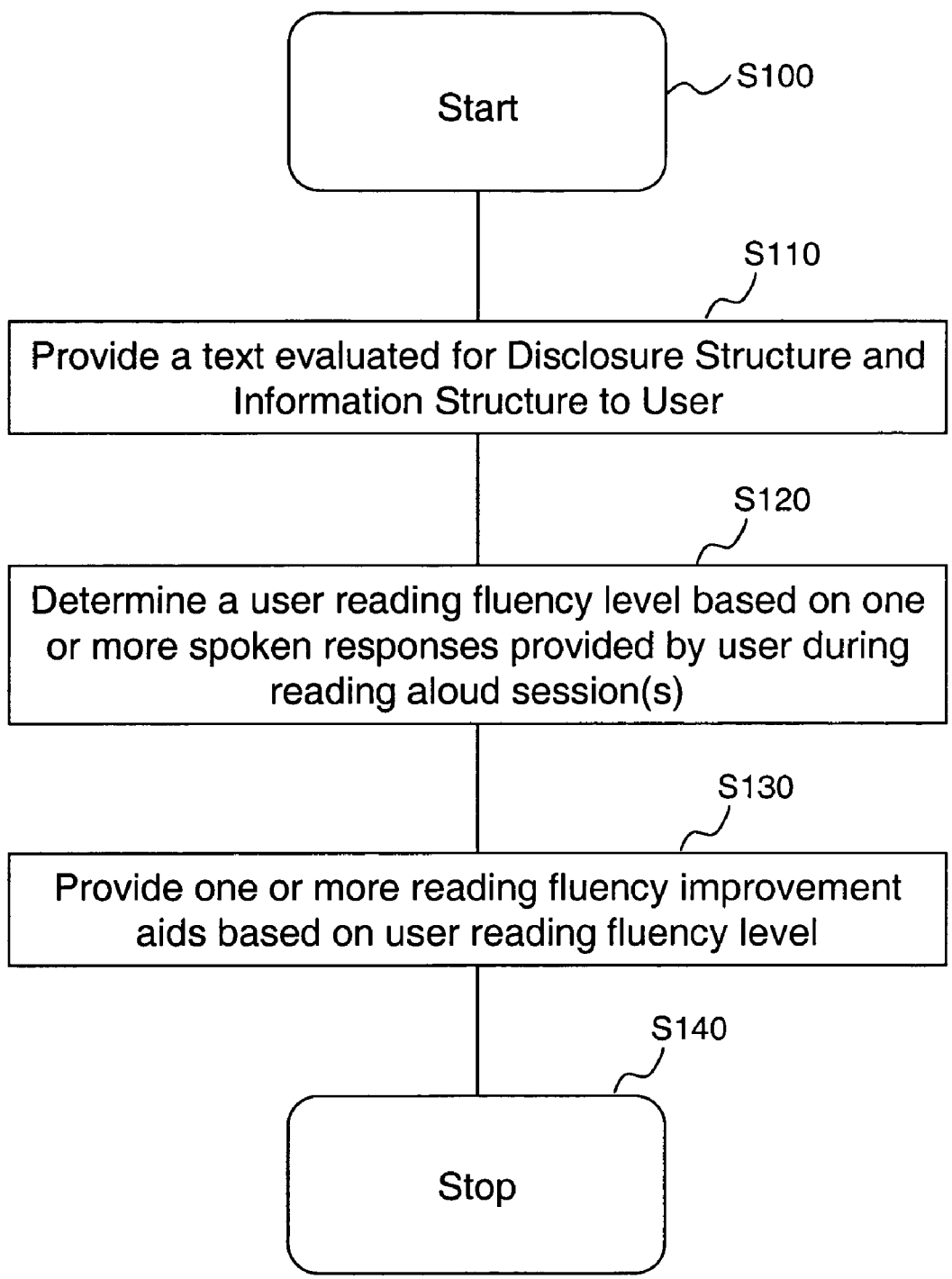
FIG. 4 is a flowchart outlining one exemplary embodiment of a method for dynamic reading fluency improvement according to this invention.

FIG. 4 is a flowchart outlining one exemplary embodiment of a method for dynamic personalized reading instruction improvement at the sentence level according to this invention. As shown in FIG. 4, operation begins at step S100 and continues to step S110, where a text is selected and loaded into memory. The text may be selected from a library of previously reviewed textual material appropriate for the reading level of the users. However, in various exemplary embodiments according to this invention, texts may be automatically reviewed based on an automatic scoring of linguistic difficulty. A library manager may be used to select texts for users based on determined reading level and personalization information. The selected text material may be stored in a word processing format, such as Microsoft Word®, rich text format, Adobe® Portable Document Format (PDF), hypertext markup language (HTML), extensible markup language (XML), extensible hypertext markup language (XHTML), open eBook format (OEB), ASCII text, utf-8 or utf-16 format, or any other known or later developed document format.

In various exemplary embodiments, the text retrieved has previously been analyzed using a theory of discourse analysis. The text may be analyzed using the linguistic discourse model discussed above or may be analyzed using any other known or later-developed method of discourse analysis. In various exemplary embodiments, the text retrieved has previously been analyzed for information structure of sentences using one or more of the methods of information structure analysis discussed above or any other known or later-developed methods of information structure analysis. Operation then continues to step S120.

In step S120, a user's reading fluency level is determined based on one or more spoken responses provided by a user during one or more reading aloud sessions. Operation then continues to step S130, where based on the input provided by the user, reading instructor, and/or other relevant person, or as automatically determined by the reading fluency improvement system, various reading fluency improvement aids and/or other computer-based pedagogical aids are provided to the user. In various exemplary embodiments, the reading fluency improvement aids may include one or more of: visually-provided improvement aids, audio-provided improvement aids, or a combination thereof.

In various exemplary embodiments, reading fluency improvement aids may include one or more of: document annotation methods or techniques, such as, for example, "fluid document" annotation techniques; text color marking methods or techniques, such as, for example, methods showing target words, sentence and/or paragraph in the text read; acoustic clues techniques, such as, for example, providing tunes without words that show various word, sentence and/or phrase relations; and audio-provided intonation techniques or methods, such as, for example, using exaggerated intonation to emphasize various discourse relations, and the like. Operation then continues to step S140, where the operation of the method stops.

Figure 5:
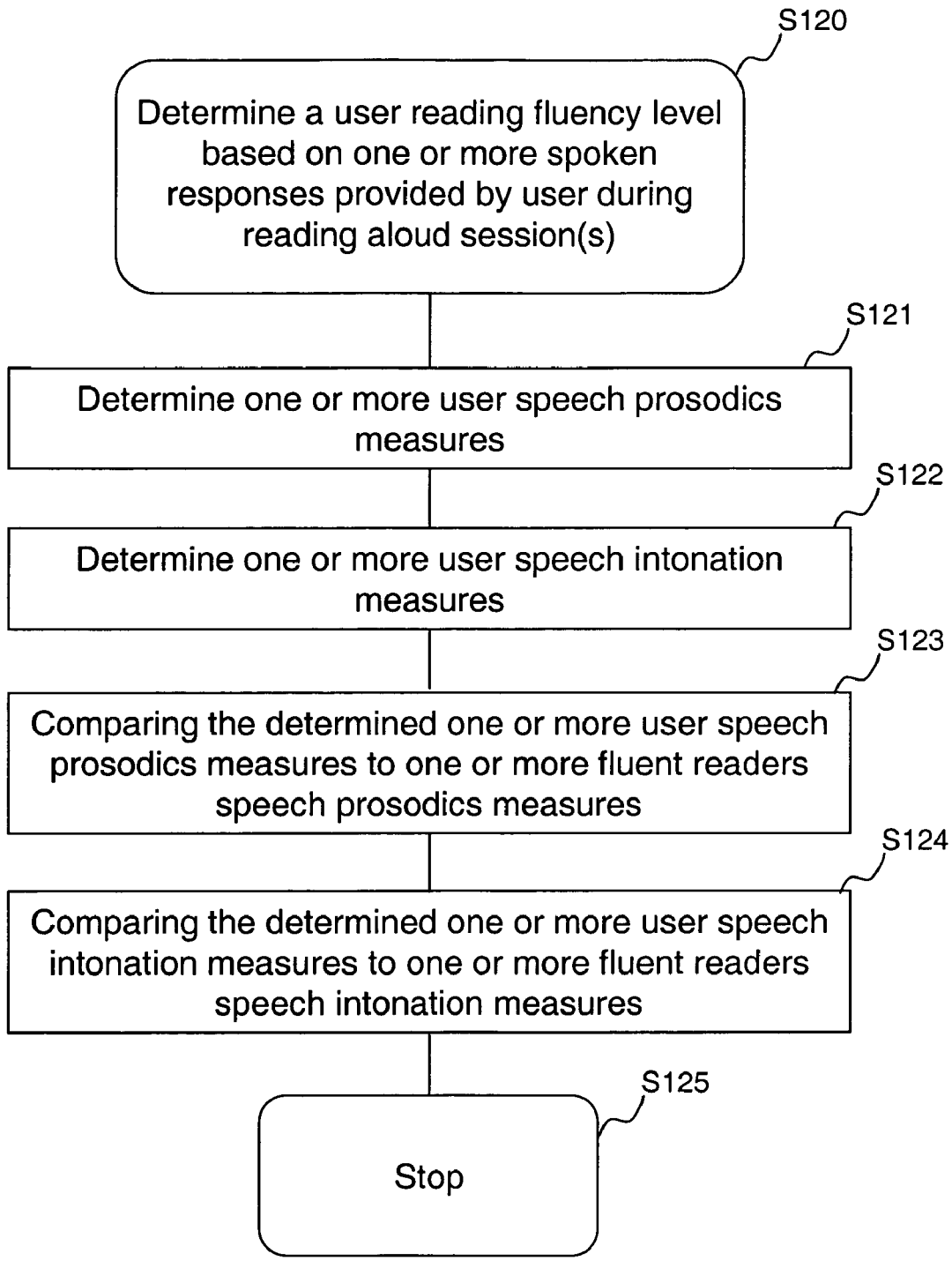
FIG. 5 is a flowchart outlining in greater detail one exemplary embodiment of the method for determining a user's reading fluency level according to this invention.

FIG. 5 is a flowchart outlining in greater detail one exemplary embodiment of the method for determining a user's reading fluency level of the method for dynamic reading fluency proficiency assessment of FIG. 4 according to this invention.

As shown in FIG. 5, operation begins in step S 120, and continues to step S121, where one or more user speech prosodics measures are determined from the one ore more verbal responses provided by the user by evaluating the user's one or more spoken or verbal utterance. In various exemplary embodiments, the determined speech prosodies may include one or more speech prosody metrics or measures, such as, for example, speech rhythm, speech stress, and speech intonation. Operation then continues to step S122.

In step S122, one or more user speech intonation measures are determined from the one or more verbal responses provided by the user by evaluating the user's one or more spoken or verbal utterances. In various exemplary embodiments, the determined intonation metrics or measures may include, for example, pitch level, pitch range, speech rate, and/or speech amplitude. Then, in step S123, the determined one or more user speech prosodic metrics or measures are compared to one or more predetermined fluent-reader speech prosodics measures. Such comparison could take place by aligning the user's speech with the stored fluent speech, and by calculating the difference between the values of user and predetermined measures, using standard ways of calculating the distance between multiple dimensional feature vectors, such as, for example, the cosine distance.

Next, in step 124, the one or more determined user speech intonation metrics or measures are compared to one or more predetermined fluent-reader speech intonation measures. In an exemplary embodiment, the comparison is performed by calculating the distance between the values for the user's and the predetermined measures, as described above for step S123. Operation then continues to step S125, where the operation of the method returns to step S130.

In various exemplary embodiments according to this invention, the reading level, learning gradient and personalization information for the user may be entered prior to providing a text to the user. Reading level information indicates the user's current position within a reading instruction curriculum. In various embodiments according to this invention, the reading level may be input directly by the user, determined dynamically through testing sequences, retrieved from a log of the user's previous personalized reading instruction sessions or by using any other known or later developed method for determining a reading level.

Personalization information for the user may also be entered at the beginning of the session. However, in various other exemplary embodiments, the personalization may be retrieved from a previous personalized reading instruction session, retrieved from a centralized registrar of records or determined using any other known or later developed method of determining pedagogically useful information. For example, the personalization information may include family name and family relationship information useful in personalizing the analyzed text for the user.

In various exemplary embodiments according to this invention, a tunable text summary may be generated based on the determined reading level of the user. A tunable text summary may be generated using the "Systems and Methods for Generating Text Summaries", "Systems and Methods for Generating Analytic Text Summaries" or any other summary generator capable of generating grammatical tunable text summaries. The tunable text summary is used to adjust the display text based on the user's determined reading level. In various exemplary embodiments according to this invention, a shorter and/or simpler text is displayed based on the determined reading level of the user. For example, a shorter and/or simpler sentence may be displayed which simplifies the sentence while preserving the salient information and grammaticality of the sentence. The shorter simpler grammatical sentences facilitate reading comprehension by low reading level users. It will be apparent that the use of the tunable text summary to generate simpler texts is merely illustrative and that any method of generating grammatically simpler text may be used in the practice of this invention.

In various exemplary embodiments according to this invention, various types of comprehension aids, such as visual aids, may be provided to the user during reading aloud reading fluency proficiency assessment and/or improvement session. For example, a less complicated text layout that facilitates concept comprehension and which provides layout space for the comprehension aid may be selected for low reading level users. In various exemplary embodiments, a less complicated text layout is accomplished by positioning the text and the associated comprehension aid in close proximity.

In various other exemplary embodiments according to this invention, the user's personalization information may also be used to adjust the comprehension aids, the text layout and/or to adjust the text based on the user's language, culture, age or any other known or later developed personalization information. For example, if the language of instruction is Chinese, the text layout may be adjusted to properly orient and display the text based on the vertical alignment the user is likely to encounter in introductory Chinese texts. Alternatively, the selection of the comprehension aids such as graphic icons, sounds and or movie clips and the like may be based on other personalization information such as age and/or cultural information. In this way, age and culturally appropriate comprehension aid graphic icons are selected for display. Although age, language and cultural information are discussed with respect to personalization information, it will be apparent that any personalization information may be used in the practice of this invention.

As shown in FIG. 1, in various exemplary embodiments, the reading fluency improvement system 200 is implemented on a programmed general purpose computer. However, the reading fluency improvement system 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4-5, can be used to implement the reading fluency improvement system 200.

Moreover, the reading fluency improvement system 200 can be implemented as software executing on a programmed general purpose computer, a special purpose computer, a microprocessor or the like. In this case, the reading fluency improvement system 200 can be implemented as a resource residing on a server, or the like. The reading fluency improvement system 200 can also be implemented by physically incorporating it into a software and/or hardware system, such as the hardware and software systems of a general purpose computer or of a special purpose computer.

Although the invention has been described in detail, it will be apparent to those skilled in the art that various modifications may be made without departing from the scope of the invention.

What is claimed is:

1. A method of dynamic reading fluency instruction, comprising:
   providing a text evaluated for discourse structure and information structure of sentences to a user;
   determining a user reading fluency level based on one or more spoken responses provided by the user during one or more reading aloud sessions of the evaluated text; and providing at least one comprehension aid based on the determined reading fluency level, wherein determining the user reading fluency level includes determining user prosodic measures from the one or more spoken responses and comparing the user prosodic measures to prosodic measures of speech by fluent readers or determining user intonation measures from the one or more spoken responses and comparing the user intonation measures to intonation measures of the speech by the fluent readers.

2. The method of claim 1, wherein the at least one comprehension aid comprises one or more of: visually-provided improvement aid, audio-provided improvement aid, or a combination thereof.

3. The method of claim 1, further comprising determining one or more subsequent user reading fluency levels after at least one comprehension aid is provided to the user.

4. The method of claim 1, wherein the at least one comprehension aid includes one or more of a graphic icon, an animation, audio information and video information.

5. The method of claim 1 further comprising recording the one or more spoken responses provided by the user during the one or more reading aloud sessions of the evaluated text.

6. The method of claim 1, wherein the text is evaluated based on at least one of a Discourse Structures Theory, a Linguistic Discourse Model, an Information Structure Theory, a Rhetorical Structure Theory, a Systemic Functional Grammar and Tagmemics.

7. A method of dynamic reading fluency instruction, comprising:
providing a text evaluated for discourse structure and information structure of sentences to a user;
determining a user reading fluency level based on one or more spoken responses provided by the user during one or more reading aloud sessions of the evaluated text;
providing at least one comprehension aid based on the determined reading fluency level; and
displaying a grammatical tunable text summary based on the determined reading fluency level.

8. The method of claim 7, further comprising displaying salient information from the grammatical tunable text summary based on at least one of: a user request, determined reading speed, determined comprehension level.

9. The method of claim 7, wherein at least one comprehension aid is associated with at least one portion of the grammatical tunable text summary.

10. The method of claim 7, wherein the at least one comprehension aid is a human sensible concept explanation for at least one of the portions of the grammatical tunable text summary.

11. A method of dynamic reading fluency instruction, comprising:
providing a text evaluated for discourse structure and information structure of sentences a user;
determining a user reading fluency level based on one or more spoken responses provided by the user during one or more reading aloud sessions of the evaluated text; and
providing at least one comprehension aid based on the determined reading fluency level,
wherein determining the user reading fluency level comprises:
determining one or more user speech prosodic measures provided in the one or more spoken responses; and
comparing the determined one or more user speech prosodic measures to one or more fluent readers speech prosodic measures.

12. The method of claim 11, wherein determining one or more user speech prosodic measures comprises determining one or more user speech prosodic measures using a speech analysis system.

13. The method of claim 11 further comprising determining a speech prosody match that approximates the one or more user speech prosodic measures to one or more fluent reader speech prosodic measures.

14. The method of claim 11, wherein the one or more fluent reader speech prosodic measures are selected from a predetermined group of fluent readers speech prosodic measures.

15. A method of dynamic reading fluency instruction, comprising:
providing a text evaluated for discourse structure and information structure of sentences a user;
determining a user reading fluency level based on one or more spoken responses provided by the user during one or more reading aloud sessions of the evaluated text; and
providing at least one comprehension aid based on the determined reading fluency level,
wherein determining the user reading fluency level comprises:
determining one or more user speech intonation measures provided in the one or more spoken responses; and
comparing the determined one or more user speech intonation measures to one or more fluent readers speech intonation measures.

16. The method of claim 15, wherein determining one or more user speech intonation measures is performed using a speech analysis system.

17. The method of claim 15 further comprising determining a speech intonation measures match that approximates the one or more user speech intonation measures to the one or more fluent readers speech intonation measures.

18. The method of claim 15, wherein the one or more fluent readers speech intonation measures are selected from a predetermined group of fluent readers speech intonation measures.

19. A method of dynamic reading fluency instruction, comprising:
providing a text evaluated for discourse structure and information structure of sentences to a user;
determining a user reading fluency level based on one or more spoken responses provided by the user during one or more reading aloud sessions of the evaluated text; and
providing at least one comprehension aid based on the determined reading fluency level,
wherein determining the user reading fluency level comprises:
determining one or more user speech prosodic measures provided in the one or more spoken responses;
determining one or more user speech intonation measures provided in the one or more spoken responses;
comparing the determined one or more user speech prosodic measures to one or more fluent readers speech prosodic measures; and
comparing the determined one or more user speech intonation measures to one or more fluent readers speech intonation measures.

20. The method of claim 19, wherein determining one or more user speech prosodic measures comprises determining one or more user speech prosodic measures using a speech analysis system.

21. The method of claim 19 further comprising determining a speech prosody match that approximates the one or more user speech prosodic measures to one or more fluent reader speech prosodic measures.

22. The method of claim 19, wherein determining one or more user speech intonation measures is performed using a speech analysis system.

23. The method of claim 19 further comprising determining a speech intonation measures match that approximates the one or more user speech intonation measures to the one or more fluent readers speech intonation measures.

24. The method of claim 19, wherein the one or more fluent readers speech intonation measures are selected from a predetermined group of fluent readers speech intonation measures.

25. A method of dynamic reading fluency instruction, comprising:

provinding a text evaluated for discourse structure and information structure of sentences to a user;

determining a user reading fluency level based on one or more spoken responses provided by the user during one or more reading aloud sessions of the evaluated text; and providing at least one comprehension aid based on the determined reading fluency level, wherein determining a user reading fluency level comprises displaying salient information from a grammatical tunable text summary based on at least one of a user request; determined reading speed; and determined comprehension level.

* * * * *